*INVENTOR.*
DAVID H. MARTIN
BY John G. Mills
*ATTORNEY*

United States Patent Office 3,618,389
Patented Nov. 9, 1971

3,618,389
APPARATUS AND METHOD FOR DETECTING A VACUUM AND THE QUALITY THEREOF
David H. Martin, 820 Merrie Road,
Raleigh, N.C. 27606
Filed Sept. 22, 1969, Ser. No. 859,733
Int. Cl. G01l 7/00
U.S. Cl. 73—388     8 Claims

ABSTRACT OF THE DISCLOSURE

Apparatus and method for determining the gas pressure and/or quality of a vacuum comprising a vacuum source, a thermally insulated container under the influence of the vacuum, thermal sensors associated with said insulated container and a medium in said container to be thermally sensed. Thermal sensing of the medium is directly related to the removal of vapor from the medium. After the medium is sensed, corresponding saturated vapor pressures are obtained from standard tables and plotted along a linear graph of saturated vapor pressure versus air pressure to predict the quality of the vacuum system, i.e. vapor removal ability of the vacuum system.

BACKGROUND OF THE INVENTION

Vacuum systems have been extensively used both experimentally and commercially for many years. The simple vacuum is, of course, produced by reducing the gas pressure in the desired area compared to surrounding gas pressure. In the course of reducing pressure air or the surrounding gases are pumped away and are not immediately replaced. The pumping away or removal of the immediate gases produces a pressure gradient across the system which serves as a driving force in certain environments for the removal of water vapor, solvent vapor, etc. along with the system gases. For example, a vacuum pump may be used to dehydrate certain articles and when combined with a cooling capability, for freeze drying. Additionally, it is known that by lowering the surrounding air pressure, liquids experiencing the lower pressure will boil at lower temperatures, the boiling point being determined by the amount of vacuum being pulled, i.e. the lower the pressure, the lower the boiling point.

Another example of commercial exploitation of vacuum systems would be the desalinization of salt water. By subjecting the salt water to a vacuum system, the boiling point is lowered and hence less heat is expended in removal of pure water from the briny solution. Simultaneously, the vacuum pump or other suitable means for reducing the pressure in the system will produce the driving force for the removal of the pure water vapors being emitted from the salt water.

Freeze drying and desalinization of sea water are but two of many examples of commercial processes that employ vacuum systems for removal of vapors by the driving force produced by the pressure gradient. Moreover, numerous laboratory or experimental procedures employ a vacuum system for qualitative or quantitative analyses that are to be conducted.

The freeze drying as previously mentioned is primarily used in the food industry when a particular item, coffee, for example, is percolated, etc. and then rapidly freeze dried. Virtually all of the water in the percolated coffee is removed and the remaining residue is composed of mainly pure coffee crystals. These coffee crystals are then packaged and sold to the consumer who uses the crystals as desired and rehydrates them to a desired consistency by the addition of hot water. Likewise, many other comestibles are susceptible to similar processing whereby the need for subsequent care and treatment is diminished and shelf life is prolonged.

The freeze drying and other aforementioned processes are lacking in at least one important facet-quality control. Trial and error methods are now being employed to determine the state of the product during processing. Specifically, the moisture content of the product must be periodically checked by weighing to determine when the product has reached the desired state of dehydration. Such methods are both time consuming and costly and lead to inefficient operation of the process equipment. Accordingly, a more sophisticated and reliable method of continuously or periodically monitoring the process for the quantity or rate of water vapor or other material being removed should be readily accepted to replace the presently used trial and error procedures. The present invention provides such a method as well as the apparatus for performing the techniques.

Furthermore the present invention provides additional and heretofore unknown tools for the researcher to foster his understanding of vacuum systems. Equivalent total pressures in two vacuum systems or in the same system on different runs do not necessarily indicate equivalent ability to remove vapor from the system. Accordingly, the researcher, by employing the teachings of the present invention can now duplicate with certainty, experiments that require critical control of vapor removal from the system.

No similar system has appeared in the prior art. Moreover, the prior art is devoid of any teaching that would even remotely suggest or direct one to the novel apparatus or method as disclosed and taught by the present invention.

SUMMARY OF THE INVENTION

It is an object of the present invention to provide novel apparatus for the determination of the vapor removal ability of a vacuum system.

It is a further object of the present invention to provide novel apparatus for the determination of the vapor removal ability of a vacuum system that is produced by either a low capacity or a high capacity means.

Still a further object of the present invention is to provide a novel apparatus for determining the gas pressure in a vacuum system.

Generally speaking, the pressure and/or quality determining apparatus of the present invention comprises a vacuum source; a thermally insulated container positioned within the influence of a vacuum produced by said vacuum source; said thermally insulated container being adapted to receive a sample of a medium to be sensed; and thermal sensing means.

A further object of the present invention is to provide a novel method for determining the vapor removal ability of a vacuum system.

Generally speaking, the method of the present invention comprises the steps of sensing the temperature of a thermally insulated medium under the influence of the vacuum to be tested; obtaining a saturated vapor pressure value of the area at or near the medium at the sensed temperature and plotting the obtained saturated vapor pressure on a curve of saturated vapor pressure versus air pressure where the vapor removal ability of the system improves as the curve approaches the intersection of the x and y axes of the graph.

In a dry system, that is, where no water vapor is present in appreciable quantities, the method of the present invention will also indicate from the plot of vapor pressure versus gas pressure, the gas pressure in the system. In a wet system, however, where vapor of some medium is present in appreciable quantities, the gas pressure does not necessarily become apparent from the vapor pressure obtained.

Instead the determinative is the quality or vapor removal ability of the vacuum system. Once the vapor removal rate is known, it may be easily determined how long material should be subjected to the system to reach a desired state of dehydration. Hence, one may, utilizing the teachings of the present invention program the vacuum operated processes to determine the length of time a particular material must remain under the influence of the vacuum to achieve a desired moisture level. Such procedures will alleviate the costly and time consuming trial and error moisture determination, now being conducted and will reduce excessive time exposure of the material to the system, thus improving the overall efficiency of the system and quality control of the end product.

DESCRIPTION OF THE PREFERRED EMBODIMENTS

Figure 1:
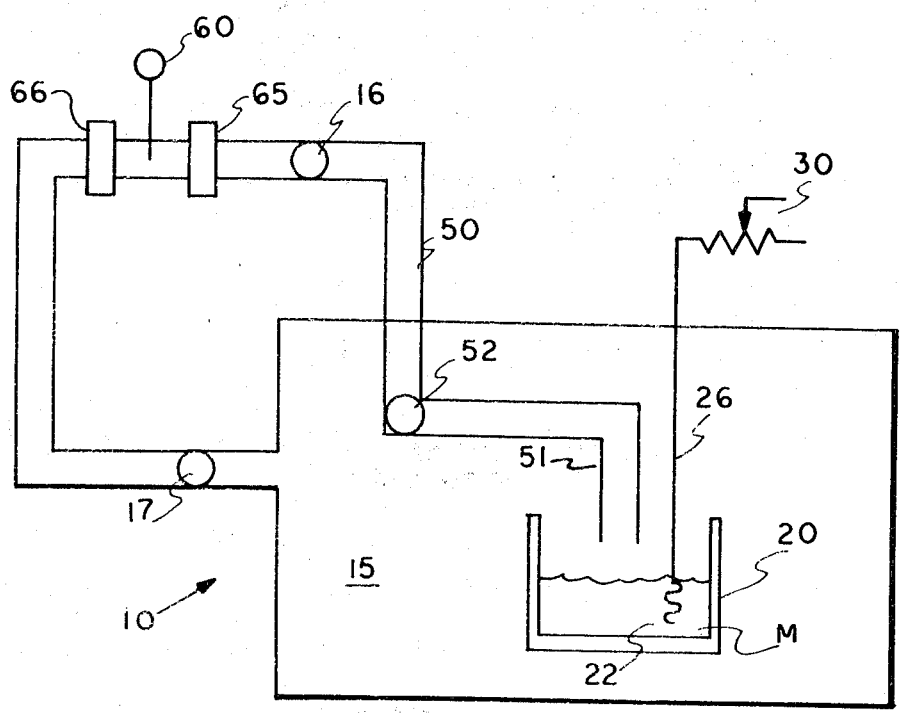
FIG. 1 shows a schematic diagram of a preferred arrangement of apparatus for detecting the quality of a vacuum according to the teachings of the present invention.

In describing the present invention, it would be helpful perhaps to investigate, in short, some of the theory behind the present invention.

Water that is thermally insulated, when subjected to a low pressure environment will tend to experience a drop in temperature. A steady state heat balance may be used to calculate theoretical temperatures under such low pressure conditions. The equation for the heat balance takes the form $$H_{cont} + H_{rad} + H_{air} = H_{water} \qquad (Eq. I)$$

where $H_{cont}$=Heat input due to conduction of the container or other solid paths $H_{rad}$=Heat input due to radiation $H_{air}$=Heat input due to conduction of gas in the system (convection assumed negligible) and $H_{water}$=Heat loss due to evaporation, or sublimation of water molecules and subsequent removal by diffusion.

Each of the terms of Equation I has a temperature dependence and can be calculated, at least at low pressures, to solve Equation I for the equilibrium temperature of a sample. Practically speaking, however, geometrical uncertainity in thermal and pressure gradients make the calculations unreliable, and further, the theory does not apply for water-air mixtures.

It has been determined, as will be explained hereinafter, that the heat due to radiation and the heat due to conduction of the container or other solid paths are negligible and may be discouned. Accordingly, the heat due to conduction of gas in the system need only be considered for the left side of the equation. Hence, practical application for solving this equation is accomplished by measuring the temperature of a sample subjected to the vacuum system and then obtaining the saturated vapor pressure for the temperature determined. Plotting the saturated vapor pressure on a calibrated curve of saturated vapor pressure versus air pressure will provide a positive indication of the degree of vapor removal ability of the vacuum system. In a dry system, as mentioned previously, where appreciable amounts of water vapor are absent, the apparatus of the present invention serves simultaneously as a pressure gauge. The presence of water vapor in the system, however, produces erroneous pressure readings. Hence when water vapor is present, the present apparatus invention shows apparent gas pressure values that are higher than the actual gas pressure in the system, but is completely reliable as an indicator for the quality of the system. As such, the nature of the vacuum is irrelevant to operation of the persent invention.

Heat due to conduction through solid paths and heat due to radiation are assumed to be negligible due to the following findings. Using different system geometry, the results were essentially the same. One procedure involved placing the medium sample (ice) in the bottom of the container while another procedures involved covering the junction of a thermocouple with an ice droplet. Obviously the system geometry as to solid path conduction and radiation differed greatly between these two approacehs, though as stated above, results obtained were very similar.

Referring to FIG. 1, the schematic diagram illustrates a suitable apparatus that may be used for determining the temperature of a medium and thereafter the quality of the system. A vacuum system, generally indicated as 10 is employed, however, the entire system is not shown. Instead only the inlet chamber 15 is shown in which is preferably located an insulated container 20. A medium which may be water is placed in container 20 which is under the influence of the vacuum in the system. Extending down into container 20 is a thermal sensor such as a thermocouple 22. Thermocouple 22 may be any suitable type such as, for instance, an iron-constantan thermocouple which has proved very satisfactory. Thermocouple 22 is connected through an appropriate electrical connector 26 to a potentiometer 30 which indicates the determined temperature.

FIG. 1 also shows a vacuum line 50 which leads into inlet chamber 15 and connected through a vacuum seal 52 to a tube 51 that extends downwardly into container 20 toward water or medium M. Thermocouple 22 may be connected to tube 51 by suitable insulated members, whereby thermocouple 22 depends from tube 51. Rotation of tube 51 may thus be used to position thermocouple 22 in medium M or at some precise distance above medium M. For the sake of simplicity, thermocouple 22 is not shown to be attached to tube 51 in FIG. 1 since this attachment is not necessary for the successful operation of the present invention, but is a possible variation thereof.

A pressure gage 60 is also shown in line 50 which is bracketed by a pair of refrigerated vapor traps 65 and 66. Though a pressure gage, per se, is not required for the actual quality determination made according to the teachings of the present invention, a calibrated curve of saturated vapor pressure versus air or gas pressure must be available for practice of the present invention. Accordingly, gauge 60 was used in preparing the calibrated curve during experimental development of the present invention.

The amount of vacuum being pulled on a system is, of course, dependent upon the source for producing the vacuum. For the purposes of the present invention, the vacuum source is irrelevant and is not shown in FIG. 1. Both high capacity and low capacity vacuum sources may be used though certain changes in apparatus are required to accommodate the low capacity source. Inherently with the operation of low capacity sources, water vapor remains in the system, thus causing erroneous pressure readings. The low capacity vacuum pumps may, however, be employed when refrigerated traps are used to remove the vapor from the system. Such refrigerated traps may be employed by placing them between the medium and the pump or may be integral with the sensing unit, that is, the insulated container, thermocouple, etc. Normally placement of the refrigerated trap should be such that there is a warm region between the trap and the medium to be sensed to provide heat flow to the medium. As will be discussed later, however, this distance factor may be overcome and made needless in the situation where a heat source is employed to provide a constant heat input to the medium. While any suitable type of refrigerated or cold trap may be employed that will remove the vapor from the vacuum system, it has been found that a trap cooled with liquid nitrogen removed all appreciable vapors from the system.

Figure 3:
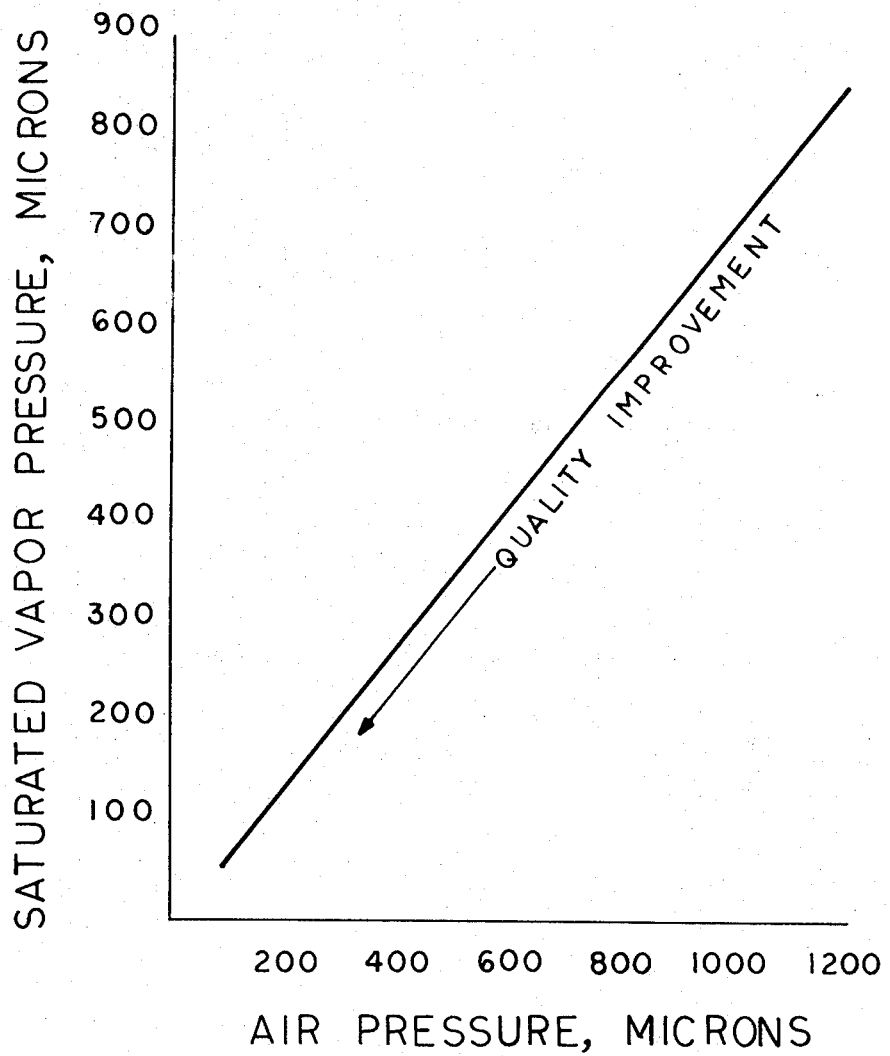
FIG. 3 shows a plot of saturated vapor pressure versus air pressure in the vacuum system.

In operation, a medium to be thermally sensed, may be of the same substance that is to be removed by the vacuum system. Medium M is placed in container 20 and container 20 is suitably located in the vacuum system. Thermocouple 22 is then positioned in or immediately adjacent medium M and the vacuum source is energized. As the amount of vacuum is increased the temperature of medium M decreases. The temperature of medium M is then sensed, the saturated vapor pressure therefor obtained from standard tables and the vapor pressure plotted on a calibrated curve such as is shown in FIG. 3. The further down the slope of the saturated vapor pressure slots, the better the quality of the vacuum, that is, the better the vapor removal ability of the vacuum.

The medium or substance to be thermally sensed may be matched with the substance being removed from the system as mentioned above. This is not necessary, however, and the medium may be selected from a numerous array of materials such as water, ice, carbon dioxide, solvents, solid nitrogen, etc, and used as a standard.

Figure 2:
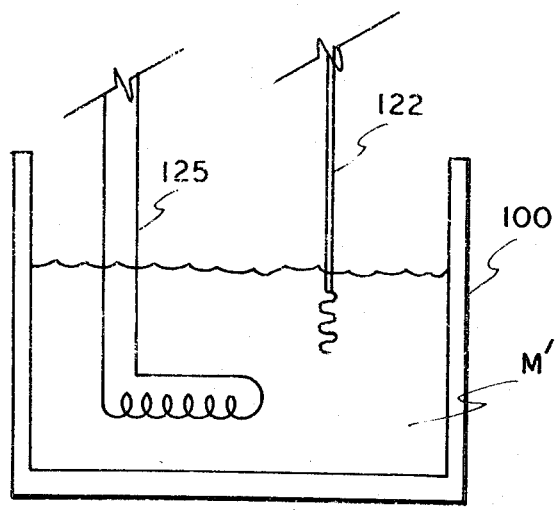
FIG. 2 illustrates a preferred arrangement of a thermally insulated container, a medium therein and a thermal sensor according to the teachings of the present invention.

A modified sensor unit is shown in FIG. 2. An insulated container 100 contains a medium M', the temperature of which will be sensed under the influence of the vacuum system to be tested. Leading down into medium M' is a thermal sensor 122 which preferably is a thermocouple. Thermal sensor 122 will, in operation, be connected to a potentiometer (not shown) as was discussed with reference to FIG. 1. Heat to the medium as discussed with respect to FIG. 1 was provided by normal conduction through the gas in the system. In FIG. 2, however, a heat source 125 is associated with container 100 to supply a constant amount of heat to medium M'. Heat supplied to medium M' effectively overcomes all the terms on the left side of Equation I, thus making the heat balance depend entirely on vapor removal. The presence of a heat source hence leads to better linearity for pressure measurement and as to quality measurements, the medium temperature (and associated saturation vapor pressure) is now a direct function of the rate of vapor removal. Numerous heat sources are available that would perform satisfactorily according to the teachings of the present invention. A small heater coil or resistance type heater are two examples of suitable heat sources.

Numerous advantages result from the application of the present invention. Very importantly, the sensor unit as shown in FIG. 2 may be very inexpensively manufactured. In fact, a throw-away sensor unit could be employed, whereby the quality of a vacuum system could be determined for different runs where different media are being thermally sensed without the danger of contamination. The quality measurements for every investigation would therefore be equally reliable. A throw-away sensor unit could have all elements thereof integral with the container. The thermocouple, for instance would be attached to, but insulated from the container. Likewise, the heat source and cold trap may be integral with the container, and where both a refrigerated trap and heat source are both incorporated into the sensor unit, there is no need for positioning of the trap away from the medium since a constant amount of heat will be applied to the medium by the heat source. All devices that are associated with the container should be insulated from the container so as not to unduly influence the heat input to the medium being sensed.

The physical make up of the major apparatus, especially for commercial application, of the vacuum system does not usually permit simplicity of testing apparatus. The apparatus of the present invention may, however, be remotely positioned in the apparatus since all data therefrom is obtained away from the sensor itself. Accordingly, the sensor unit may be remotely placed in the system as is directed by the location of the vacuum source and the vacuum chamber without adversely affecting the operation of the process. Placement of the sensor unit within the vacuum chamber subjects the sensor unit to actual operating conditions, whereby the results obtained are accurate for existing system conditions. Such placement is especially advantageous in a process where water vapor, solvent vapor, or the like is being removed from a particular material and where it is desirable, if not critical to remove an accurate amount of the vapor.

A decreasing pressure environment is sensed very rapidly by the present apparatus and method. Temperature of the medium responds quickly to a decreasing pressure and one is able to check the equilibrium quality of the system very soon after operation of the system begins. In the situation where pressure in the system is increasing, however, the response is not quite as rapid due to the nature of the saturated water vapor pressure curve.

The following example illustrates the principles of the present invention.

Example 1

A 1-liter Dewar flask was located at the inlet of high vacuum (lowest pressure) stage of a 6-stage Graham steam jet ejector. Samples of distilled water (30 cc.) were placed in the Dewar flask and contacted with an iron-constantan thermocouple which was connected to a potentiometer. A cold trapped McLeod gauge, Model CVC GM 100A and a Decker differential pressure gauge were installed in the system to measure pressure. The 6-stage Graham steam jet ejector was then put into operation and, by utilizing the various stages of the ejector, various pressures below atmospheric were produced in the chamber. As the system operated, temperature of the ice formed from the distilled water was periodically determined. The saturated vapor pressures for the temperatures were then obtained and these valves plotted against the corresponding pressures determined by the McLeod and Decker gauges. The following data were obtained.

| Air pressure, microns: | Saturated vapor pressure [1], microns |
|---|---|
| 100 | 40 |
| 340 | 190 |
| 600 | 360 |
| 1000 | 610 |
| 1175 | 725 |
| 1500 | 900 |

[1] Saturated vapor pressure obtained from standard tables from Chemical Rubber Handbook.

The above data when plotted as saturated vapor pressure versus air pressure shows a linear relationship between the two ordinates as may be seen in FIG. 3. Hence, having a calibrated curve of saturated vapor pressure of the medium being tested versus air pressure of the system, one can obtain reliable pressure measurement by obtaining the temperature of the medium, reading the saturated vapor pressure of the medium at the particular temperature and plotting on the calibrated curve referred to above. The pressure measurements are valid, however, only in a system having high enough capacity to render water or other vapor content or residual gases negligible. Since, however, ice temperature measured in the aforedescribed manner is really a measure of the rate of water vapor loss, then for all systems, either in the presence or absence of appreciable amounts of water or other vapor, the apparent residual gas pressures as determined above are a measure of the "quality" of the vacuum system, i.e. the ability of the system to remove water or other vapors.

The above example and explanation show the feasibility of the present invention. In a commercial environment, once a calibrated curve of saturated vapor pressure versus gas pressure has been obtained the medium samples may be located within the vacuum system and temperatures obtained by a thermocouple or other suitable method. These temperatures are then converted to saturated vapor pressures from standard tables and when the saturated vapor pressures are applied to the calibrated curve one will then be able to realize the effectiveness of the system for removing vapors. Though not shown on the curve in FIG. 3, a quantitative scale may be produced for rate of vapor removal and applied to the curve. The length of time may then be determined for exposing a particular substance to the system to achieve the desired degree of dehydration, etc. This system thus allows commercial systems to be be accurately operated to the betterment of efficiency of the system and the end product produced.

The preferred embodiments of the present invention having been described, one skilled in the art should be able to make modifications and changes thereto. Accordingly, the scope of the present invention should be governed by the scope of the claims appended hereto.

What is claimed is:
1. A method for determining the gas pressure and/or quality of a vacuum system comprising the stpes of:
   (a) Obtaining the temperature of a medium that is located in an insulated container under the influence of the vacuum system;
   (b) Obtaining from standard tables, the saturated vapor pressure for the medium at the previously obtained temperature, and
   (c) Plotting the saturated vapor pressure obtained on a calibrated curve of saturated vapor pressure versus gas pressure for the system being tested, whereby the lower the apparent gas pressure read from the curve, the better the quality of the vacuum system.
2. The method as defined in claim 1 wherein the medium that is thermally sensed is ice.
3. The method as defined in claim 1 wherein the temperature is obtained by means of an iron-constantan thermocopule immersed in the medium.
4. The method as defined in claim 1 wherein the temperature is obtained by means of an iron-constantan thermocopule located above the medium.
5. The method as defined in claim 1 wherein the heat is supplied to the medium to be sensed.
6. The method as defined in claim 1 wherein vapors are removed from the vacuum system by a refrigerated trap.
7. The method as defined in claim 1 wherein the vacuum system is employed to remove unwanted material from a product and the medium to be thermally sensed is the same as the said unwanted material.
8. The method as defined in claim 1 wherein heat is supplied to the medium, the temperature of the medium is obtained by means of an iron-constantan thermocouple and vapors are removed from the system by means of a refrigerated trap.

References Cited

UNITED STATES PATENTS 3,055,206   9/1962   Watson et al. _____ 73—15

DONALD O. WOODIEL, Primary Examiner